US009020424B2

(12) United States Patent
Lefley (10) Patent No.: US 9,020,424 B2
(45) Date of Patent: Apr. 28, 2015

(54) NFC DEVICE COMBINING COMPONENTS OF ANTENNA DRIVER AND SHUNT REGULATOR

(75) Inventor: Alastair Lefley, Kemble (GB)

(73) Assignee: Broadcom Corporation, Irvine, CA (US)

( * ) Notice: Subject to any disclaimer, the term of this patent is extended or adjusted under 35 U.S.C. 154(b) by 322 days.

(21) Appl. No.: 13/523,445

(22) Filed: Jun. 14, 2012

(65) Prior Publication Data

US 2013/0337744 A1 Dec. 19, 2013

(51) Int. Cl.
*H04B 5/00* (2006.01)
*G06K 19/07* (2006.01)

(52) U.S. Cl.
CPC .............. *G06K 19/0715* (2013.01); *H04B 5/00* (2013.01); *H04B 5/0075* (2013.01); *H04B 5/0037* (2013.01)

(58) Field of Classification Search
CPC .................. H04B 5/0012; H04B 5/0025–5/02; H04B 1/0458; H04B 1/18; H01Q 1/2216
USPC ........................................................ 455/41.1
See application file for complete search history.

(56) References Cited

U.S. PATENT DOCUMENTS

| 7,786,870 B2 | 8/2010 | Zettler | |
| 7,822,383 B2 * | 10/2010 | Miyagawa et al. | 455/39 |
| 2010/0112941 A1 | 5/2010 | Bangs et al. | |
| 2010/0291871 A1 * | 11/2010 | Butler | 455/41.1 |
| 2012/0252362 A1 * | 10/2012 | Kawata | 455/41.1 |
| 2013/0084802 A1 * | 4/2013 | Clarke | 455/41.1 |
| 2013/0337744 A1 | 12/2013 | Lefley | |
| 2013/0337756 A1 * | 12/2013 | Wilson | 455/230 |

FOREIGN PATENT DOCUMENTS

| CN | 101198970 A | 6/2008 |
| CN | 203563063 U | 4/2014 |
| WO | WO 2008117029 A2 * | 10/2008 |

* cited by examiner

*Primary Examiner* — Gennadiy Tsvey
(74) *Attorney, Agent, or Firm* — Sterne, Kessler, Goldstein & Fox PLLC (57) ABSTRACT

Embodiments of the present disclosure can be used to produce smaller, more compact antenna drivers at a reduced cost. Systems and methods for integrating components of an antenna driver with components of a shunt regulator and clamp are provided. By combining these components according to embodiments of the present disclosure, transistor count in an antenna driver can be reduced. This integrated device advantageously allows antenna driver functionality, regulator functionality, and clamp control functionality to be provided at a reduced manufacturing cost and with reduced real estate.

20 Claims, 10 Drawing Sheets

NFC DEVICE COMBINING COMPONENTS OF ANTENNA DRIVER AND SHUNT REGULATOR

FIELD OF THE INVENTION

This invention relates to antennas and more specifically to NFC transceiver devices.

BACKGROUND

In many conventional communications devices, separate circuitry is often included to provide antenna driver functionality and regulator/clamp functionality. Implementations using separate circuitry for antenna driver functionality and regulator/clamp functionality can require several large transistors, which increases manufacturing cost and real estate.

For example, many conventional antenna driver circuits incorporate two large input/output transistors on each antenna port. A conventional antenna driver for a near field communication (NFC) device can include a N-type metal-oxide-semiconductor (NMOS) device for pulling current down to $V_{SS}$ (e.g., a negative power supply voltage) and a P-type metal-oxide-semiconductor (PMOS) device for supplying current from $V_{DD}$ (e.g., a positive power supply voltage). These NMOS and PMOS devices are specialized metal-oxide-semiconductor field effect transistors (MOSFETs) used to implement logic for the antenna driver circuit.

Circuitry for a regulator and clamp control for the antenna can also include NMOS devices and/or PMOS devices. Thus, adding regulator and/or clamp control circuitry to a device can further increase the manufacturing cost and the real estate (e.g., circuit board area) required for the device. These specialized transistors can be very costly and can also require large real estate on the transceiver device integrated circuit (IC).

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the disclosure. However, it will be apparent to those skilled in the art that the disclosure, including structures, systems, and methods, can be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described can include a particular feature, structure, or characteristic, but every embodiment does not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although the present disclosure is to be described in terms of near field communications (NFC) embodiments, those skilled in the relevant art(s) will recognize that the present disclosure may be applicable to other communications that use the near field and/or the far field without departing from the spirit and scope of the present disclosure. For example, although the present disclosure is described using NFC-capable communications devices, those skilled in the relevant art(s) will recognize that functions of these NFC-capable communication devices may be applicable to other communications devices that use the near field and/or the far field without departing from the spirit and scope of the present disclosure.

1. Overview

Embodiments of the present disclosure provide systems and methods for combining components of an antenna driver with components of a shunt regulator and clamp to reduce transistor count in an antenna driver circuit. Because these transistors can be very costly, as they are required to source or sink several hundred milliamps, embodiments of the present disclosure can be used to produce antenna drivers at a reduced cost. Further, because these transistors can require significant silicon area on an integrated circuit (IC), embodiments of the present disclosure can advantageously be used to produce a smaller, more compact antenna driver when compared with traditional devices requiring separate circuitry for antenna driver functionality and regulator/clamp control functionality.

Embodiments of the present disclosure provide systems and methods for combining N-type metal-oxide-semiconductor (NMOS) input/output transistors of an antenna driver with NMOS input/output transistors of the shunt regulator and clamp. For example, embodiments of the present disclosure provide an integrated antenna driver, regulator, and clamp control circuit. By reusing these NMOS transistors for both antenna driver and shunt regulator/clamp functionality, total transistor count in a device can be reduced.

2. Implementation

Figure 3A:
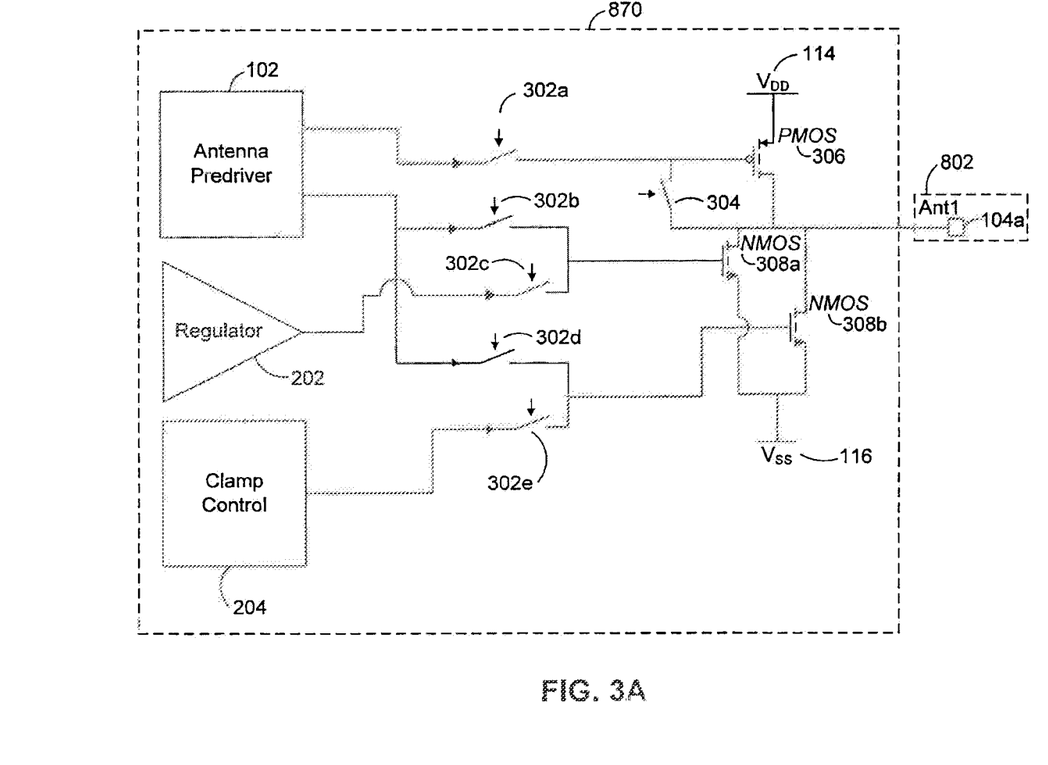
FIG. 3A shows a circuit diagram of an integrated antenna driver, regulator, and clamp control circuit in accordance with an embodiment of the present disclosure.
Figure 3B:
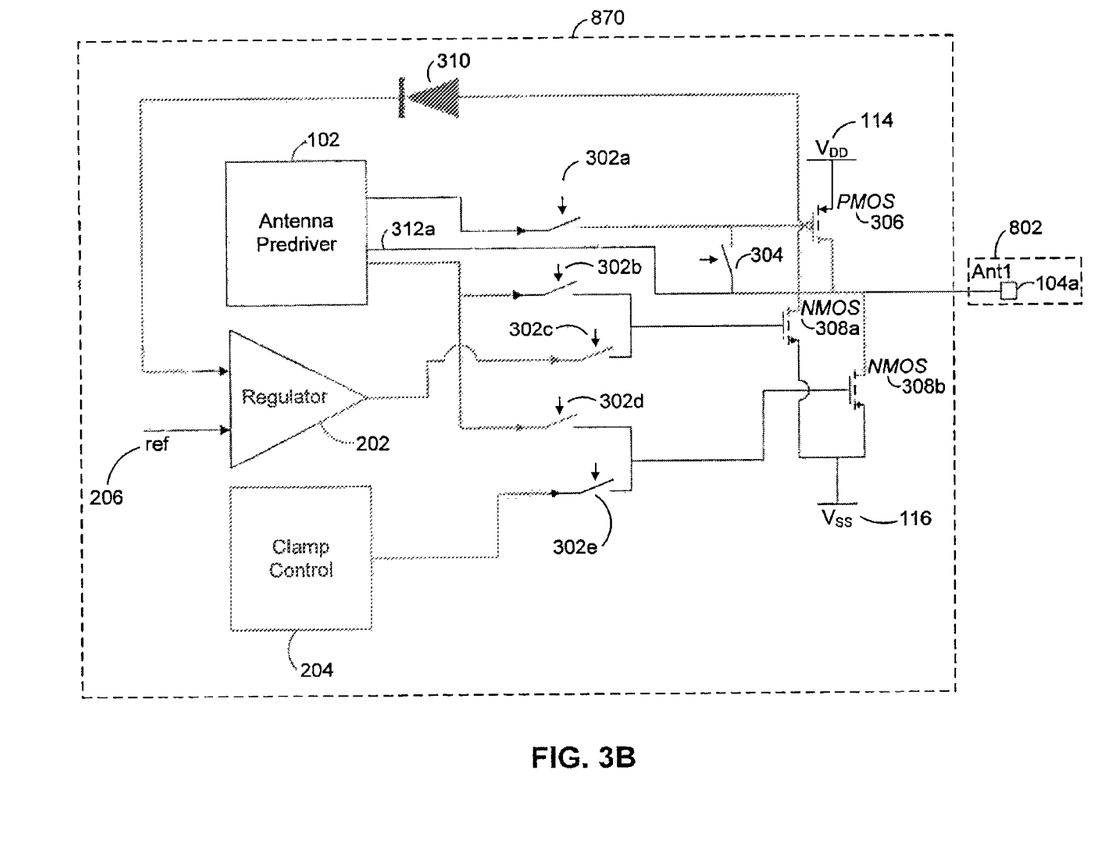
FIG. 3B shows another circuit diagram of an integrated antenna driver, regulator, and clamp control circuit in accordance with an embodiment of the present disclosure.
Figure 4:
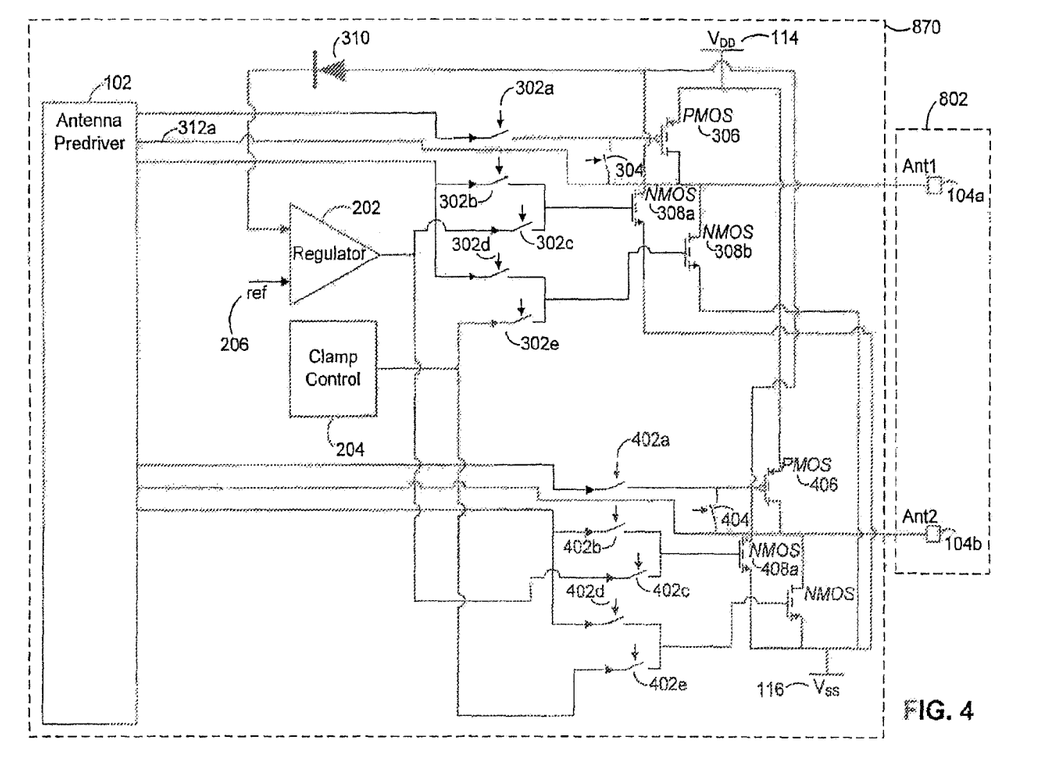
FIG. 4 shows a circuit diagram of an integrated antenna driver, regulator, and clamp control circuit for two antenna ports in accordance with an embodiment of the present disclosure.

FIGS. 3A, 3B, and 4 show circuit diagrams of an integrated antenna driver, regulator, and clamp control circuit in accordance with embodiments of the present disclosure. Embodiments of the present disclosure (e.g., as shown by FIGS. 3A, 3B, and 4) can be implemented on one or more ICs. For example, in an embodiment, all the elements shown in FIG. 3A can be implemented on a single IC, all the elements shown in FIG. 3B can be implemented on a single IC, and all the elements of FIG. 4 can be implemented on a single IC. In an embodiment, the integrated antenna driver, regulator, and clamp control circuit of FIGS. 3A, 3B, and/or 4 can be incorporated into a near field communications (NFC) device. NFC devices will now be described with reference to FIGS. 6, 7, and 8.

2.1 NFC Environments

Figure 6:
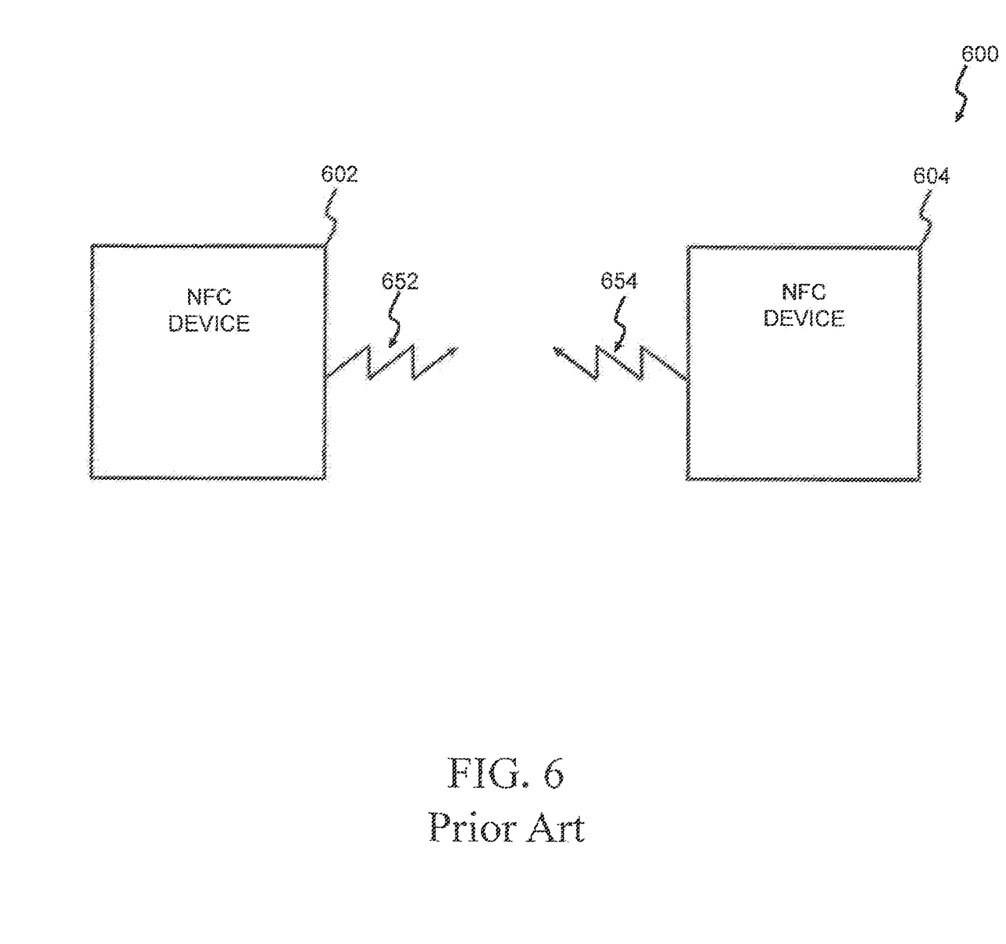
FIG. 6 illustrates a block diagram of a NFC environment.

FIG. 6 illustrates a block diagram of a NFC environment according to an exemplary embodiment of the disclosure. A NFC environment 600 provides wireless communication of information, such as one or more commands and/or data, among a first NFC device 602 and a second NFC device 604 that are sufficiently proximate to each other. The first NFC device 602 and/or the second NFC device 604 may be implemented as a standalone or a discrete device or may be incorporated within or coupled to another electrical device or host device such as a mobile telephone, a portable computing device, another computing device such as a laptop, tablet computer, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure. Herein, when incorporated within or coupled to another electrical device or host device, this type of NFC device may be referred to as a NFC capable device.

The first NFC device 602 generates a magnetic field and probes the magnetic field for the second NFC device 604. The first NFC device 602 and the second NFC device 604 may be implemented using a Type A standard, a Type B standard, a Type F (FeliCa) standard, and/or a vicinity standard. The Type A and Type B standards are further defined in the "NFC Forum: NFC Activity Specification: Technical Specification, NFC Forum™ Activity 1.0 NFCForum-TS-Activity-1.0," published Nov. 18, 2010 (hereinafter the "NFC Activity Specification") and/or ISO/IEC 14443-3, "Identification cards—Contactless integrated circuit(s) cards—Proximity cards—Part 3: Initialization and anticollision," published on Jun. 11, 1999, which are incorporated herein by reference in their entirety. The Type F standard is further defined in the NFC Activity Specification. The Vicinity standard is further defined in ISO/IEC 15693-3:2009, "Identification cards—Contactless integrated circuit(s) cards—Vicinity cards—Part 3: Anti-collision and transmission protocol," published on Apr. 6, 2009 (hereinafter the "Vicinity Specification").

Upon establishing communication with the second NFC device 604, the first NFC device 602 modulates its corresponding information onto the first carrier wave and generates the first magnetic field by applying the modulated information communication to a first antenna of the first NFC device to provide the first information communication 652. The first NFC device 602 continues to apply the first carrier wave without its corresponding information to continue to provide the first information communication 652 once the information has been transferred to the second NFC device 604. The first NFC device 602 is sufficiently proximate to the second NFC device 604 such that the first information communication 652 is inductively coupled onto a second antenna of the second NFC device 604.

The second NFC device 604 derives or harvests power from the first information communication 652 to recover, to process, and/or to provide a response to the information. The second NFC device 604 demodulates the first information communication 652 to recover and/or to process the information. The second NFC device 604 may respond to the information by applying its corresponding information to the first carrier wave that is inductively coupled onto the second antenna to provide the second modulated information communication 654.

Further operations of the first NFC device 602 and/or the second NFC device 604 may be described in International Standard ISO/IEC 18092:2004(E), "Information Technology—Telecommunications and Information Exchange Between Systems—Near Field Communication—Interface and Protocol (NFCIP-1)," published on Apr. 1, 2004 and International Standard ISO/IEC 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

2.2 NFC Device Integration Into Host Device

Figure 7:
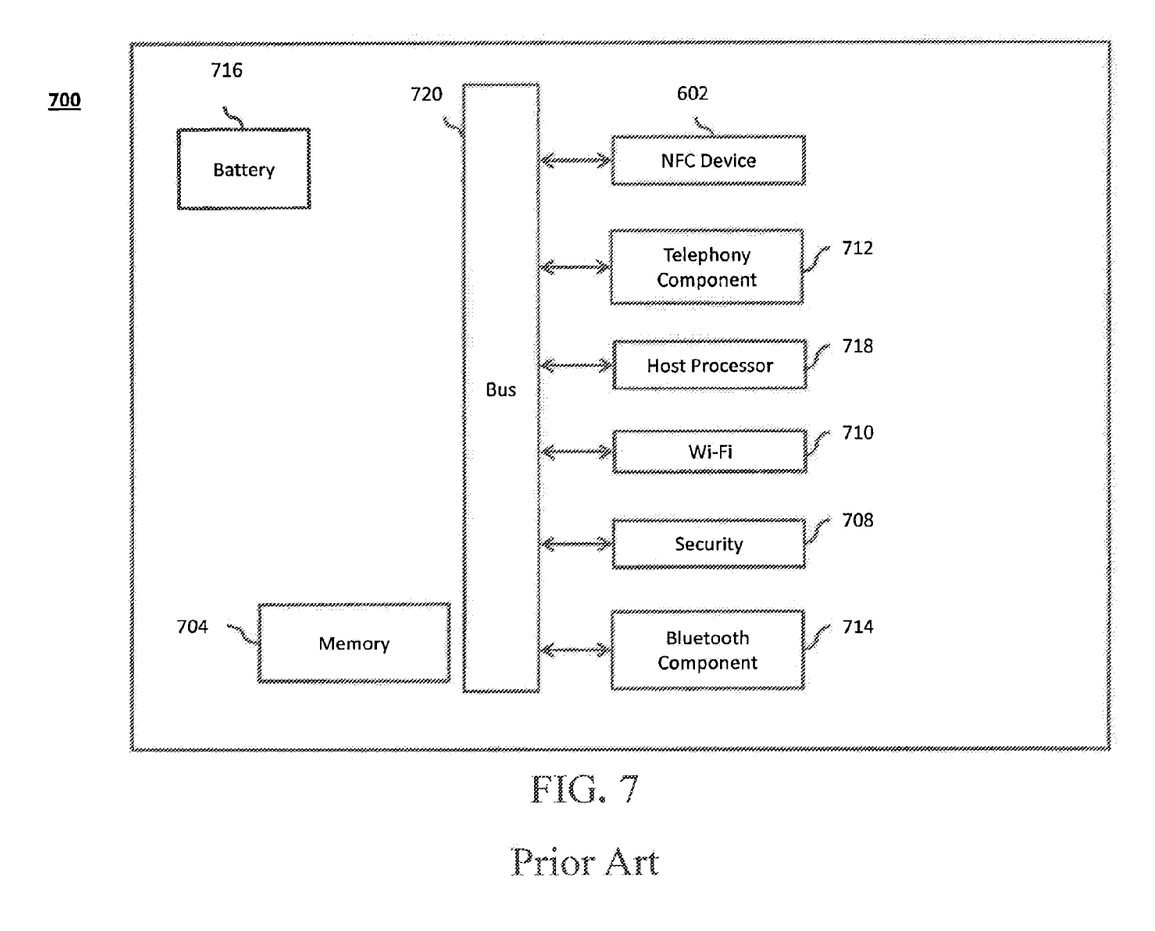
FIG. 7 shows a block diagram illustrating integration of an NFC device into an electronic host communications device with a shared memory.

NFC devices (such as NFC device 602) may be integrated into a host communications device (e.g., a host mobile phone). FIG. 7 shows a block diagram illustration integration of NFC device 602 into electronic host communications device 700 with a shared memory 704 according to embodiments of the present disclosure. In an embodiment, the electronic communications device 700 includes the NFC device 700, the memory 704, a security component 708, a WI-FI component 710, a telephony component 712, a Bluetooth component 714, a battery 716 used to power the communications device, a host processor 718, and a bus 720. It should be understood that components 712, 718, 710, 708, and 714 are optional and are provided to illustrate components that may be incorporated into a host communications device. It should further be understood that, according to embodiments of the present disclosure, one, several, all, or none of components 712, 718, 710, 708, and 714 may be incorporated into the host communications device 700.

According to embodiments of the present disclosure, host communications device 700 may represent a number of electronic communications devices including, but not limited to, mobile telephones, portable computing devices, other computing devices such as personal computers, laptops, desktop computers, computer peripherals such as printers, portable audio and/or video players, payment Systems, ticket writing systems such as parking ticket systems, bus ticketing systems, train ticketing systems, or entrance ticketing systems.

In an embodiment, NFC devices and/or NFC controllers are designed to include secure element(s) that use a secure external memory. In an embodiment, this secure external memory is provided by a host mobile device (e.g., memory 704). In another embodiment, this secure external memory is provided by a dedicated additional non-volatile memory chip, such as flash or EE memory. Utilizing this external memory enables the NFC device and/or NFC controller to be manufactured using 40 nm process technology, Which does not necessarily support non-volatile memory.

2.3 Integrated Antenna Driver, Regulator, and Clamp Control Circuit

Figure 8:
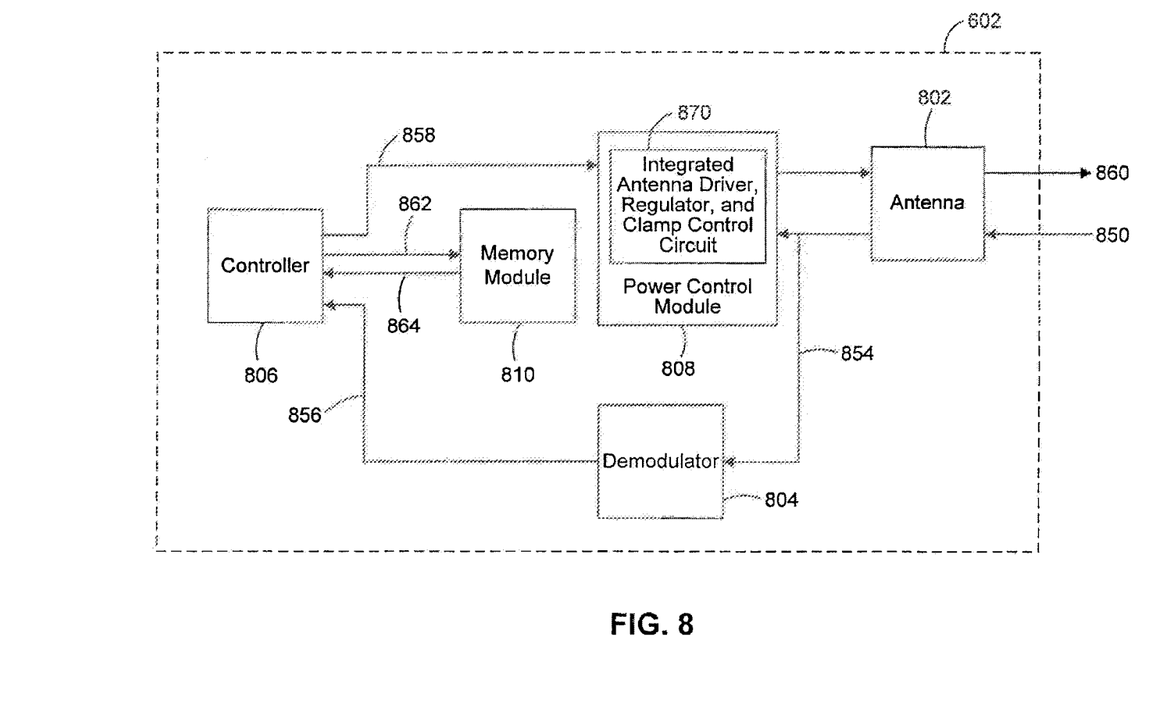
FIG. 8 illustrates a block diagram of an NFC device with an integrated antenna driver, regulator, and clamp control circuit in accordance with an embodiment of the present disclosure.

FIG. 8 illustrates a block diagram of an NFC device with an integrated antenna driver, regulator, and clamp control circuit in accordance with an embodiment of the present disclosure. NFC device 602 is configurable to operate in a target, or tag, mode of operation to respond to a polling command from a second NFC capable device, such as NFC device 604, in a polling mode of operation. NFC device 602 may represent a NFC tag or a NFC communicator. A NFC reader is a type of NFC device that is capable of operating in an initiator mode to initiate a communication with another NFC enabled device. A NFC tag is a type of NFC device that is capable of operating in the target mode to respond to the initiation of a communication by another NFC enabled device. A NFC communicator is a type of NFC device that is capable of operating in the initiator mode or in the target mode and is capable of switching between these two modes.

NFC device 602 may represent a standalone or a discrete device or may represent a NFC capable device. Since the second NFC capable device may be configured substantially similarly to the NFC device 602, the following description focuses on describing the NFC device 602. NFC device 602 may have a plurality of identities associated with it, such as a ticket, credit card, identification, etc. NFC device 602 includes an antenna module 802, a demodulator module 804, a controller module 806, a power control module 808, and a memory module 810. NFC device 602 may represent an exemplary embodiment of NFC device 604.

The antenna module 802 inductively receives a communications signal 850 from the second NFC capable device to provide a recovered communications signal 854. Typically, the received communications signal 850 includes a polling command that has been modulated by the second NFC capable device.

The demodulator module 804 demodulates the recovered communications signal 854 using any suitable analog or digital modulation technique to provide a recovered command 856. The recovered command 856 may be the polling command. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

When the demodulator module 804 is within a Type A tag field, it detects polling commands based on 100% ASK modulation. The voltage amplitude must drop substantially to zero, such that the demodulator module 804 functions as a gap detector for Type A tags. In this situation, any modulation based on another modulation scheme that does not drop below the threshold required for Type A tags may be given the digital value of 1. When the amplitude drops low enough, the demodulator module 804 gives it the digital value of 0 in accord with the modified Miller coding scheme.

When the demodulator module 804 is within a Type B tag field, it detects polling commands based on 10% ASK modulation. The demodulator module 804 has a voltage threshold that is at 90% of the total modulation amplitude. If the polling command's modulation decreases below that threshold, the demodulator module 804 gives it the digital value of 0 in accord with the NRZ-L coding scheme. In this situation, any modulation based on another protocol may drop below the threshold required for Type B tags and therefore be given the digital value of 0. Any modulation that remains above this threshold would be given the digital value of 1.

When the demodulator module 804 is within a Type F tag field, it detects polling commands based on a Manchester coding scheme that uses a modulation threshold between that used for Type A and that used for Type B tags. If the polling command's modulation decreases below this threshold, it will be given the digital value of 0. Any modulation that remains above this threshold would be given the digital value of 1.

As can be seen from the above, a Type A tag will not assign a digital value of 0 to any modulation based on Type B or Type F tags because the modulation amplitude would not fall below the threshold required for 100% ASK modulation. Thus, the demodulator module 804 in a Type A tag would not detect a polling command sent to detect a Type B or Type F tag.

When the demodulator module 804 is within a Vicinity standard tag field, it detects polling commands based on either 10% or 100% ASK modulation, depending on the choice of modulation by the reader, When using 100% ASK modulation, the voltage amplitude must drop substantially to zero, such that the demodulator module 804 functions as a gap detector for Vicinity standard tags. In this situation, any modulation based on another modulation scheme that does not drop below the threshold required for Vicinity standard tags may be given the digital value of 1.

When the amplitude drops low enough, the demodulator module 804 gives it the digital value of 0 in accord with pulse position modulation. When using 10% ASK modulation with the Vicinity standard, the demodulator module 804 has a voltage threshold that is at 90% of the total modulation amplitude. If the polling command's modulation decreases below that threshold, the demodulator module 804 gives it the digital value of 0 in accord with the pulse position modulation coding scheme. In this situation, any modulation based on another protocol may drop below the threshold required for Vicinity standard tags and therefore be given the digital value of 0. Any modulation that remains above this threshold would be given the digital value of 1.

Moving on to other aspects of NFC device 602, the controller module 806 controls overall operation and/or configuration of NFC device 602. The controller module 806 sends a list search command 862 to the memory module 810 when NFC device 602 supports a plurality of identities. The control module 806 receives list search response 864 with the first identity that matches the polling command characteristic(s). The controller module 306 then provides a response 858 to the recovered command 856, which incorporates list search response 864 when responding to a polling command.

Typically, the second NFC capable device inductively couples a carrier wave on the antenna module 802 as the received communications signal 850 after it has transferred the polling command to NFC device 602. The controller module 806 modulates this carrier wave in accordance with the response 858 to provide a transmitted communications signal 860. For example, an impedance of the antenna module 802 varies based upon the response 858 to vary a load of the NFC device 602 as seen by the second NFC capable device.

The memory module 810 stores a list of the plurality of identities associated with the NFC device 602. When the received communications signal 850 is a polling command which has been modulated from the second NFC capable device, the memory module 810 receives the list search command 862 in order to search the list of the plurality of identities associated with the NFC device 602. Once a match to the characteristics of the polling command is found, the memory module 810 returns the corresponding identity as list search response 864. For example, this match may represent a first identity from among the plurality of identities that matches to the characteristics of the polling command, referred to as a first match.

The power control module 808 may harvest power for NFC device 602 from the recovered communications signal 854. The power couplings from the power harvesting module 808 that supply the power to other modules of NFC device 602, such as the antenna module 802, the demodulator module 804, the controller module 806, and/or the memory module 810, are not shown in FIG. 8. Alternatively or additionally, a battery can be provided.

In an embodiment, power control module 808 includes an integrated antenna driver, regulator, and clamp control circuit 870. Integrated antenna driver, regulator, and clamp control circuit 870 reuses NMOS transistors for both antenna driver and shunt regulator/clamp functionality so that total transistor count in a device can be reduced, which allows antenna driver functionality, regulator functionality, and clamp control functionality to be provided at a reduced manufacturing cost and with reduced real estate (e.g., reduced circuit board area).

3. Conventional Antenna Drivers, Regulators, and Clamps

Figure 1A:
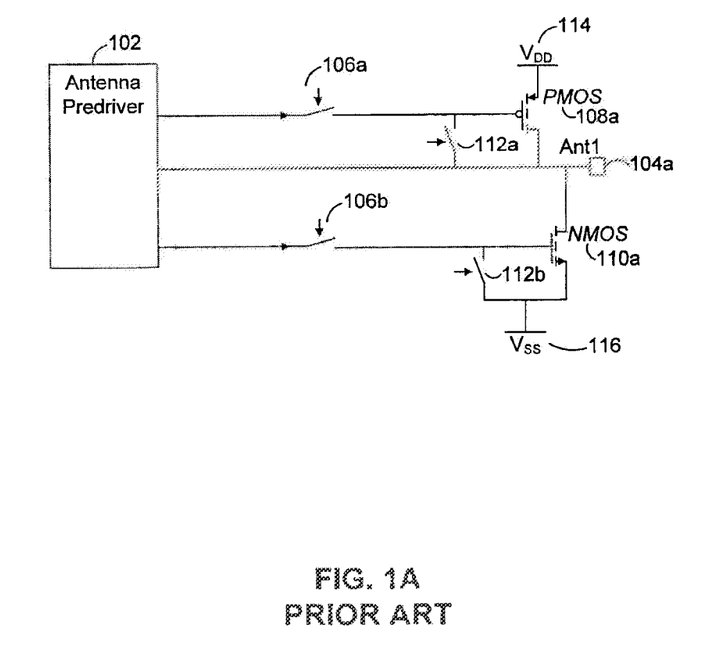
FIG. 1A shows a circuit diagram of a conventional antenna driver.
Figure 1B:
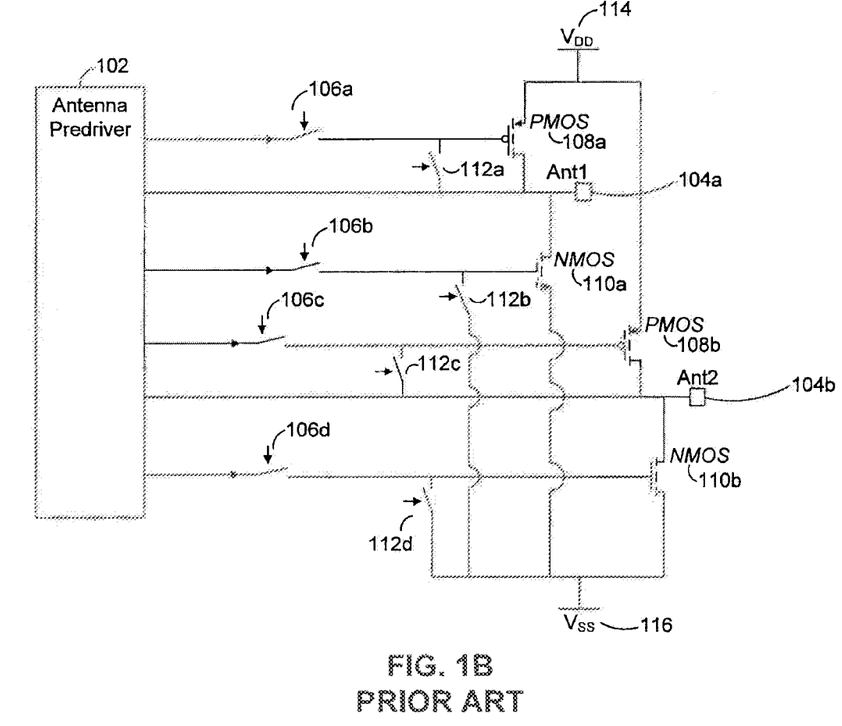
FIG. 1B shows a circuit diagram of a conventional antenna driver having two antenna ports.

Circuits for conventional antenna drivers, regulators, and clamps will now be described with references to FIGS. 1A-1C. FIGS. 1A and 1B show conventional antenna driver circuits, and FIG. 1C shows a conventional circuit including a regulator and clamp for an antenna. In conventional devices, separate circuitry is often included to provide antenna driver functionality and regulator/clamp functionality. As will be discussed below, implementations using separate circuitry for antenna driver functionality and regulator/clamp functionality can require several large transistors, which increases manufacturing cost and real estate.

3.1 Conventional Antenna Driver

FIG. 1A shows a circuit diagram of a conventional antenna driver. In FIG. 1A, antenna predriver 102 is used to power an antenna port. For example, antenna predriver 102 can be used to power antenna port 104a. Antenna predriver 102 generates a signal that gets buffered by large transistors (PMOS 108a and NMOS 110a) coupled to antenna port 104a. These large transistors allow antenna 104 to deliver a large current. For example, the area of NMOS 110a and PMOS 108a can be about 0.1 square millimeters, and these transistors can be capable of 2 mA peak current. Antenna port 104a is coupled to the drain of PMOS 108a and to the source of NMOS 110a. The source of PMOS 108a is coupled to positive supply voltage $V_{DD}$ 114, and the source of NMOS 110a is coupled to negative supply voltage $V_{SS}$ 116, The gates of PMOS 108a and NMOS 110a are coupled and decoupled to antenna predriver 102 using switches 106 and 112.

Switches 106 and 112 are cycled on and off to change the state of antenna port 104a. For example, in an embodiment, switches 106 and 112 are cycled on and off to change the state of antenna port 104a to a state for creating a magnetic field, on which data may be sent and received, or for receiving a magnetic field, on which data may be sent and received. When the antenna driver of FIG. 1 is being used to drive a magnetic field to antenna port 104a, horizontal switches 106a and 106b are closed, and vertical switches 112a and 112b are open. When horizontal switches 106 are closed, antenna predriver 102 connects to the gates of PMOS 108a and NMOS 110a. While horizontal switches 106 are closed, vertical switches 112 are open so there is no connection between the gate of NMOS 110a and $V_{SS}$ 116 and so that there is no connection between PMOS 108a and antenna port 104a.

When the antenna driver of FIG. 1A is off (e.g., when antenna port 104a is being used to receive a magnetic field), horizontal switches 106 are open, and vertical switches 112 are closed. The opening of horizontal switches 106 prevents connections between antenna predriver 102 and PMOS 108a and NMOS 110a. The closing of vertical switches 112a prevents PMOS 108a and NMOS 110a from receiving current (i.e., closing vertical switches 112 turns these transistors "off"). By opening and closing horizontal switches 106 and vertical switches 112, the antenna driver of FIG. 1A can cycle between states for creating and receiving a magnetic field. For example, in an embodiment, the antenna driver of FIG. 1A can be used as an antenna driver for a near field communications (NFC) device. When the antenna driver of FIG. 1A is placed into a state for creating a magnetic field, the NFC device can be used in a reader mode, and when the antenna driver of FIG. 1A is placed into a state for receiving a magnetic field, the NFC device can be used in a target (tag) mode.

FIG. 1B is a circuit diagram of a conventional antenna driver having two antenna ports (antenna port 104a and antenna port 104b). In FIG. 1B, antenna port 104b is coupled to two additional large transistors (PMOS 108b and NMOS 110b) that allow antenna port 104b to deliver a large current. Two additional horizontal switches (106c and 106d) and two additional vertical switches (112c and 112d) are toggled in the same fashion to place antenna port 104b in a mode to create a magnetic field or to receive a magnetic field. For example, when horizontal switches 106c and 106d are closed and vertical switches 112c and 112d are open, antenna port 104b can be used to create a magnetic field. When horizontal switches 106c and 106d are open and vertical switches 112c and 112d are closed, antenna port 104b can be used to receive a magnetic field. In an embodiment, antenna predriver 102 can drive a signal in antiphase to PMOS 108b and NMOS 110b such that the signal sent to antenna port 104b is the opposite phase of the signal sent to antenna port 104a.

3.2 Conventional Regulator/Clamp

Figure 2:
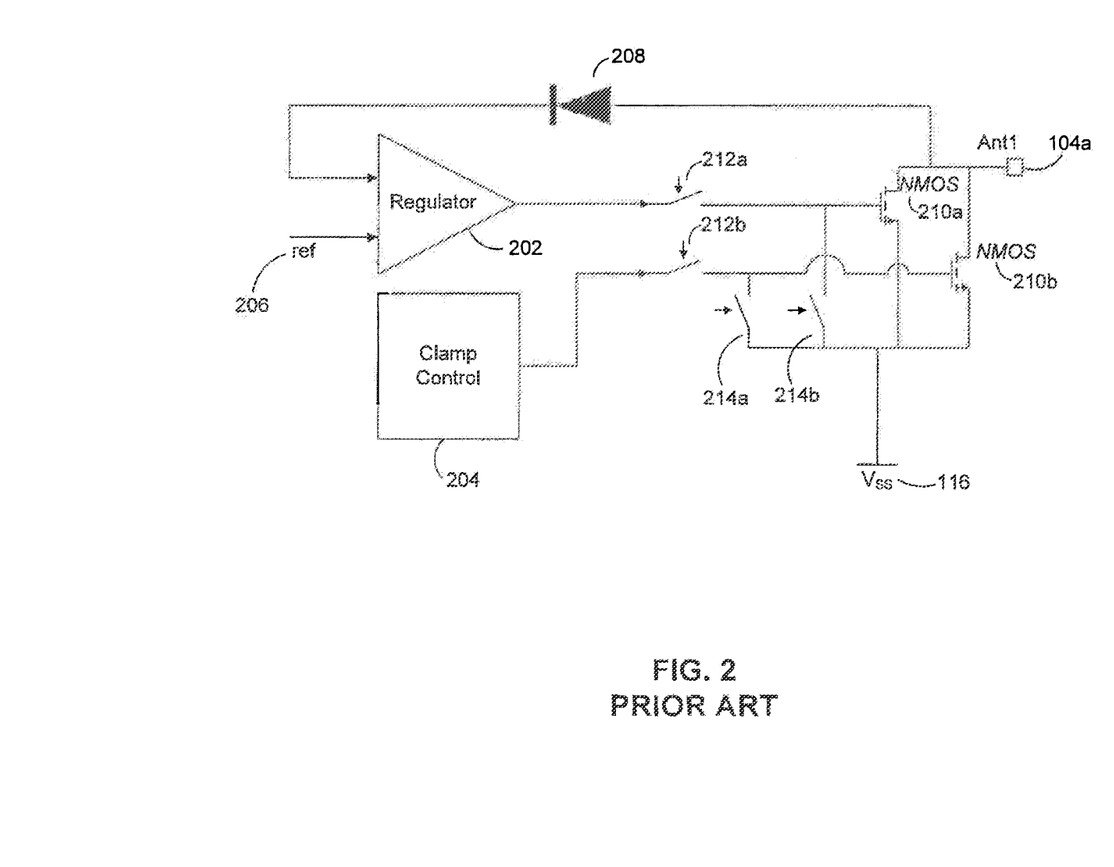
FIG. 2 shows a circuit diagram of conventional regulator/clamp circuitry for an antenna.

FIG. 2 shows a circuit diagram of conventional regulator/clamp circuitry for an antenna. In conventional devices, separate circuitry is often included to provide antenna driver functionality and regulator/clamp functionality. Thus, in many conventional communications devices, the regulator/clamp circuitry (e.g., as shown in FIG. 2) is separate from (e.g., not integrated with) the antenna driver circuitry of FIGS. 1A and 1B. Because separate circuitry is used, the transistors of FIGS. 1A and 1B are not shared with the circuitry of FIG. 2. In FIG. 2, new large transistors (NMOS 210a and NMOS 210b) are included to support regulator and clamp control functionality. NMOS 210a is used to pull voltage and/or current from antenna port 104a to $V_{SS}$ 116, and NMOS 210b is used to clamp (i.e., short circuit) voltages generated at antenna port 104a that are below $V_{SS}$ 116.

The circuit of FIG. 2 can either be turned "on" or turned "off" depending on the state of the circuit (i.e., whether antenna port 104a is used to create or receive a magnetic field). Horizontal switches 212 and vertical switches 214 are toggled open and closed to change the state of the circuit. For example, if antenna port 104a is being used to create a magnetic field, the circuit of FIG. 2 is turned "off." When the circuit of FIG. 2 is turned off, horizontal switches 212 are opened and vertical switches 214 are closed. The connection formed by closed vertical switches 214 pull the gates of transistors 210 down, to $V_{SS}$ 116 so that the output of transistors 210 is turned off.

In FIG. 2, regulator 202 can be used to maintain a signal supplied to antenna port 104a at a stable voltage. Diode 208 detects the voltage of the signal on antenna port 104a and feeds this information back to regulator 202. In an embodiment, diode 208 is a full wave rectifier and detects the voltage peaks of the signal on antenna port 104a. Diode 208 converts the AC signal on antenna port 104a to an approximate DC signal. Regulator 202 compares the output of diode 208 to a reference voltage 206, which can represent a desired voltage. If the regulator 202 determines that the voltage of the signal on antenna port 104a is not maintained close to (e.g., within a predetermined range of) the desired voltage, regulator 202 can adjust its output to maintain the voltage of the signal supplied to antenna port 104a at the desired value set by reference voltage 206.

When antenna port 104a is receiving a magnetic field, the circuit of FIG. 2 is turned "on." In this state, horizontal switches 212 are closed, and vertical switches 214 are opened. Thus, regulator 202 couples to the gate of NMOS 210a, and clamp control 204 couples to the gate of NMOS 210b. As antenna port 104a receives a magnetic field, a current flows through the antenna coupled to antenna port 104a, and a voltage builds on antenna port 104a. Regulator 202 compares the voltage detected by diode 208 against reference voltage 206, and if the detected voltage is too high, regulator 202 increases the voltage supplied to the gate of NMOS 210a, which in turn lowers the voltage supplied to antenna (and thus the current flowing through the antenna at antenna port 104a). When diode 208 detects a lower voltage, regulator 202 will stop increasing the voltage supplied to the gate of NMOS 210a.

Clamp control 204 can be used to prevent a voltage from antenna port 104a from exceeding a predefined magnitude. This functionality can be especially important if more than one antenna is present. For clarity, a single antenna port 104a is shown in FIG. 2 (e.g., for a single port antenna embodiment). However, it should be understood that embodiments of the present disclosure can include multiple antenna ports (e.g., for a dual port antenna embodiment). For example, an NFC embodiment of the present disclosure can include two antenna ports (e.g., as shown in FIG. 1B). In an embodiment of the present disclosure having two antenna ports, when the voltage at one antenna port is positive (i.e., higher than $V_{SS}$ 116), the voltage at the other port becomes negative (i.e., it is driven lower than $V_{SS}$ 116). Clamp control 204 can be used to prevent voltage lower than $V_{SS}$ from impacting the circuitry of FIG. 2.

As previously discussed, when the circuit of FIG. 2 is turned "on" and antenna port 104a is receiving a magnetic field, horizontal switches 212 are closed, and vertical switches 214 are opened. In this state, clamp control 204 is coupled to the gate of NMOS 210b. If clamp control 204 detects that the voltage at antenna port 104a is negative, clamp control 204 creates a short circuit between antenna port 104a and $V_{SS}$ 116 using NMOS 210b. For example, in an embodiment using two antenna ports, clamp control 204 can detect whether the voltage at antenna port 104a or antenna port 104b is higher. If the voltage at antenna port 104b is higher than the voltage at antenna port 104a, clamp control 204 can determine that antenna port 104a is "negative." In response, clamp control 204 adjusts the voltage supplied to the gate of NMOS 210b such that there is a short circuit between antenna port 104a and $V_{SS}$ 116. By doing so, clamp control 204 prevents voltages lower than $V_{SS}$ 116 at antenna port 104a from negatively impacting the circuitry of FIG. 2.

4. Integrated Antenna Driver, Regulator, and Clamp Control Circuit

As previously discussed, the separate circuits used to provide antenna driver functionality and regulator/clamp control functionality require several large transistors (e.g., transistors 108, 110, and 210). By integrating antenna driver functionality, regulator functionality, and clamp control functionality into a single circuit, embodiments of the present disclosure advantageously provide antenna driver functionality, regulator functionality, and clamp control functionality using a reduced number of transistors. This reduction in the number of required transistors advantageously leads to a reduction in required real estate and manufacturing cost. For example, these transistors can each require 5% or more of the real estate on an C. Thus, embodiments of the present disclosure enable cheaper, smaller ICs for providing antenna driver functionality, regulator functionality, and clamp control functionality to be produced.

FIG. 3A shows a circuit diagram of an integrated antenna driver, regulator, and clamp control circuit in accordance with an embodiment of the present disclosure. This circuit requires fewer transistors than two separate circuits providing antenna driver functionality and regulator/clamp functionality (e.g., as shown by FIGS. 1A, 1B, and 2). In an embodiment, the circuit of FIG. 3A can be implemented in an NFC device (e.g., NFC device 602). For example, the circuit of FIG. 3A can be implemented as integrated antenna driver, regulator, and clamp control circuit 870 of power control module 808.

In an embodiment, the circuit of FIG. 3A can be placed into two modes of operation: a mode of operation for receiving a magnetic field from antenna port 104a (e.g., when antenna port 104a is being used to support a target (tag) mode of an NFC device) and a mode of operation for creating a magnetic field via antenna port 104a (e.g., when antenna port 104a is being used to support an initiator (reader) mode of an NFC device).

If antenna port 104a is being used to create a magnetic field, horizontal switches 302a, 302b, and 302d are closed to allow a signal to propagate to PMOS 306 and NMOS 308a. At the same time, vertical switch 304 is open, and horizontal switches 302c and 302e are open so that regulator 202 and clamp control 204 are disconnected from the rest of the circuit. In this mode, antenna predriver 102 generates a signal that gets amplified by PMOS 306 and NMOS 308a coupled to antenna port 104a. These large transistors allow antenna port 104a to deliver a large current.

If antenna port 104a is being used to receive a magnetic field, vertical switch 304 is closed, and horizontal switches 302a, 302b, and 302d are opened to create an open circuit between antenna port 104a and antenna predriver 102. Horizontal switches 302c and 302e are closed to connect regulator 202 and clamp control 204 to the rest of the circuit. As antenna port 104a receives a magnetic field, regulator 202 regulates a signal detected at antenna port 104a, and clamp control 204 prevents a negative voltage (e.g., a voltage below $V_{SS}$ 116) at antenna port 104a from negatively impacting the rest of the circuit.

FIG. 3B shows another circuit diagram of an integrated antenna driver, regulator, and clamp control circuit in accordance with an embodiment of the present disclosure. In an embodiment, the circuit of FIG. 3B can be implemented in an NFC device (e.g., NFC device 602). For example, the circuit of FIG. 3B can be implemented as integrated antenna driver, regulator, and clamp control circuit 870 of power control module 808.

In FIG. 3B, diode 310 and feedback path 312a are shown. In an embodiment, diode 310 is a rectifier (e.g., a full wave rectifier). When regulator 202 and clamp control 204 are switched in to the circuit (i.e., when antenna port 104a is used to receive a magnetic field), diode 310 resolves the peak voltage associated with the incoming signal at antenna port 104a and compares it to reference voltage 206. Based on this comparison, regulator 202 can determine whether the voltage of the signal supplied to antenna port 104a is too high (or too low). As previously discussed, regulator 202 can increase (or decrease) the amount of voltage supplied to NMOS 308a (and thus alter the current at antenna port 104a) to maintain the voltage at antenna port 104a at a stable value.

FIG. 4 shows a circuit diagram of an integrated antenna driver, regulator, and clamp control circuit for two antenna ports in accordance with an embodiment of the present disclosure. In an embodiment, the circuit of FIG. 4 can be implemented in an NFC device (e.g., NFC device 602). For example, the circuit of FIG. 4 can be implemented as integrated antenna driver, regulator, and clamp control circuit 870 of power control module 808.

In FIG. 4, antenna predriver 102, regulator 202, and clamp control 204 can be coupled to antenna port 104a via horizontal switches 302 and to antenna port 104b via horizontal switches 402. In an embodiment, antenna predriver 102 can drive a signal in antiphase such that the signal sent to antenna port 104b is the opposite phase of the signal sent to antenna port 104a.

In an embodiment, when antenna port 104a and 104b are being used to create a magnetic field, for example, antenna predriver 102 is connected to antenna ports 104a and 104b (e.g. by closing horizontal switches 302a, 302b, 302d, 402a, 402b, and 402d). Vertical switches 304 and 404 are also opened. Regulator 202 and clamp control 204 are disconnected from antenna ports 104a and 104b by opening horizontal switches 302c, 302e, 402c and 402e. If antenna ports 104a and 104b are being used to receive a magnetic field, antenna predriver 102 can be disconnected from antenna ports 104a and 104b by opening horizontal switches 302a, 302b, 302d, 402a, 402b, and 402d and closing vertical switches 304 and 404. Regulator 202 and clamp control 204 can be coupled to antenna ports 104a and 104b by closing horizontal switches 302c, 302e, 402c, and 402e.

As current flows through the antenna, regulator 202 detects the voltage building on antenna port 104b via diode (e.g., full wave rectifier) 310. By comparing this voltage against reference voltage 206, regulator 202 can determine whether the current flowing through the antenna (via NMOS 408a) should be increased or decreased. Clamp control 204 prevents a negative voltage (e.g., a voltage below $V_{SS}$ 116) from negatively impacting the rest of the circuit of FIG. 4. When the voltage at one antenna port is positive (i.e., higher than $V_{SS}$ 116), the voltage at the other port can become negative (i.e., it is driven lower than $V_{SS}$ 116). For example, if the voltage at antenna port 104b is higher than the voltage at antenna port 104a, clamp control 204 can determine that antenna 1 is "negative." In response, clamp control 204 adjusts the voltage supplied to the gate of NMOS 308a such that there is a short circuit between antenna port 104a and $V_{SS}$ 116. By doing so, clamp control 204 prevents voltages lower than $V_{SS}$ 116 at antenna port 104a or antenna port 104b from negatively impacting the circuitry of FIG. 4.

In the integrated circuit configuration shown by FIGS. 3A, 3B, and 4, one transistor can be "saved" per antenna. In other words, by integrating antenna driver functionality, regulator functionality, and clamp control functionality onto a single circuit, one less transistor is required per antenna port with respect to conventional devices that use a separate circuit to provide antenna driver functionality and a separate circuit to provide regulator/clamp control functionality, Thus, embodiments of the present disclosure enable cheaper and smaller communications devices supporting this functionality to be manufactured.

5. Methods

Figure 5:
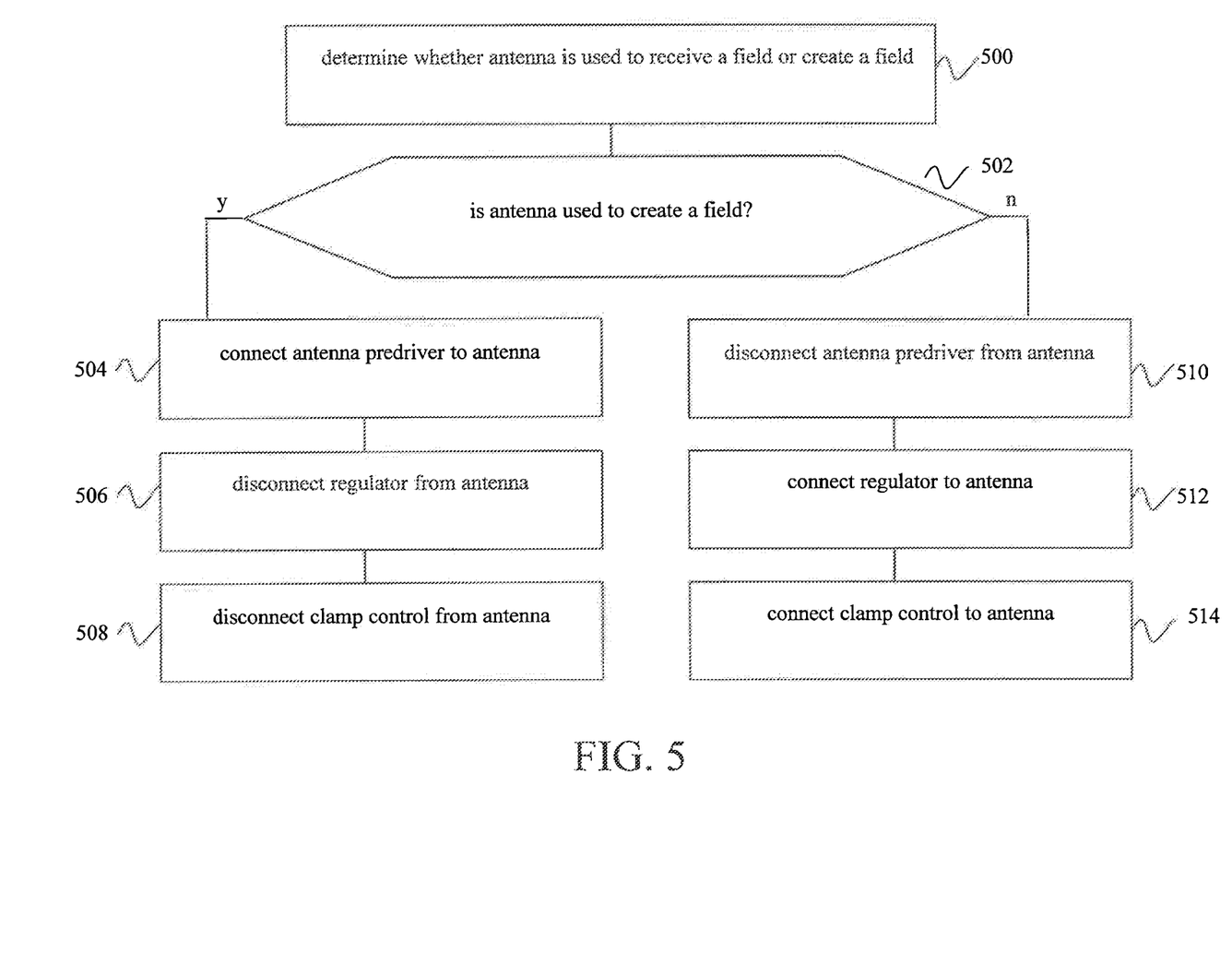
FIG. 5 is a flowchart of a method for providing antenna driver functionality, regulator functionality, and clamp control functionality in accordance with an embodiment of the present disclosure.

FIG. 5 is a flowchart of a method for providing antenna driver functionality, regulator functionality, and clamp control functionality in accordance with an embodiment of the present disclosure. In step 500, a determination is made regarding whether an antenna is used to receive a magnetic field or create a magnetic field. For example, a host device (e.g., an NFC device) can use an antenna port (e.g., using antenna port 104a) to create a magnetic field (e.g., if the NFC device is operating in a reader mode) or to receive a magnetic field (e.g., if the NFC device is operating in a target mode). A circuit supporting antenna driver functionality, regulator functionality, and clamp control functionality can then be reconfigured in step 502 based on this determination.

If the antenna port is used to create a magnetic field, the antenna predriver is connected to the antenna in step 504. For example, antenna predriver 102 is coupled to PMOS 306 and NMOS 308a by closing horizontal switches 302a, 302b, and 302d opening vertical switch 304. In step 506, the regulator is disconnected from the antenna. For example, regulator 202 is disconnected from NMOS 308a by opening horizontal switch 302c. In step 508, the clamp control is also disconnected from the antenna. For example, clamp control 204 is disconnected from NMOS 308b by opening horizontal switch 302e.

If the antenna port (e.g., antenna port 104a) is not used to create a magnetic field (i.e., if the antenna port is being used to receive a magnetic field), the antenna predriver is disconnected from the antenna port in step 510. For example, antenna predriver is disconnected from the circuit by opening horizontal switches 302a, 302b, and 302d and closing vertical switch 304. In step 512, the regulator is connected to the antenna port. For example, regulator 202 is coupled to NMOS 308a by closing horizontal switch 302c. In step 512, the clamp control is also connected to the antenna port. For example, clamp control 204 is connected to NMOS 308b by closing horizontal switch 302e.

6. Other Embodiments

An antenna driver according to embodiments of the present disclosure can also include additional functionality. For example, load modulator functions can also be combined with regulator 202. In an embodiment, load modulator functionality can also be supported without requiring additional transistors. Further, the NMOS input/output transistor (e.g., NMOS 308a) can be configured to be driven by antenna predriver 202, regulator 202, and clamp control 204 while retaining a mode in which its gate can be pulled to $V_{SS}$ 116 to turn it off.

Regulator 202 can also be redesigned to incorporate a linear shunt. In this case, the protection NMOS transistor (e.g., NMOS 308b) connects between the antenna ports (e.g., between antenna port 104a and antenna port 104b), not to $V_{SS}$ 116, and a clamp device (e.g., clamp control 204) is no longer required. Further, in an embodiment, the NMOS transistors of the linear shunt can be combined with the NMOS transistor used to support the antenna driver (e.g., NMOS 308a).

7. Conclusion

It is to be appreciated that the Detailed Description, and not the Abstract, is intended to be used to interpret the claims. For example, the Abstract can set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The representative signal processing functions described herein (e.g. channel and source decoders, etc.) can be implemented in hardware, software, or some combination thereof. For instance, the signal processing functions can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure.

The above systems and methods can be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

What is claimed is:

1. A circuit comprising:
   an antenna port coupled to a first transistor, a second transistor, and a third transistor;
   a predriver;
   a first switch configured to couple the predriver to the first transistor;
   a second switch configured to couple the predriver to the second transistor;
   a third switch configured to couple the predriver to the third transistor;
   a voltage regulator;
   a fourth switch configured to couple the voltage regulator to the second transistor;
   a clamp control; and
   a fifth switch configured to couple the clamp control to the third transistor,
   wherein:
      during a first mode, the first switch, the second switch, and the third switch are configured to close while the fourth switch and the fifth switch are configured to open, and
      during a second mode, the first switch, the second switch, and the third switch are configured to open while the fourth switch and the fifth switch are configured to close.

2. The circuit of claim 1, wherein the first transistor is a P-type metal-oxide-semiconductor (PMOS) transistor, and wherein the second and third transistors are N-type metal-oxide-semiconductor (NMOS) transistors.

3. The circuit of claim 1, wherein the antenna port is an antenna port of a near field communications (NFC) device, wherein the antenna port is configured to support a reader mode of the NFC device during the first mode, and wherein the antenna port is configured to support a target mode of the NFC device during the second mode.

4. The circuit of claim 1, further comprising a diode coupled to the antenna port and the voltage regulator, wherein the voltage regulator is configured to:
   receive a feedback signal from the diode;
   compare the feedback signal to a reference signal; and
   adjust a voltage supplied to the second transistor in response to the comparison between the feedback signal and the reference signal.

5. The circuit of claim 1, further comprising:
   a second antenna port coupled to a fourth transistor, a fifth transistor, and a sixth transistor, wherein:
      the predriver is further configured to be coupled to the fourth transistor, the fifth transistor, and the sixth transistor,
      the voltage regulator is further configured to be coupled to the fifth transistor, and
      the clamp control is further configured to be coupled to the sixth transistor.

6. The circuit of claim 5, wherein the clamp control is configured to:
   determine whether a first voltage of the antenna port or a second voltage of the second antenna port is lower;
   create a short circuit at first antenna port if the first voltage is lower; and
   create a short circuit at the second antenna port if the second voltage is lower.

7. The circuit of claim 1, wherein the fourth switch is configured to couple the voltage regulator to the second transistor such that the voltage regulator and the predriver are not both coupled to the second transistor at the same time.

8. The circuit of claim 1, wherein the fifth switch is configured to couple the clamp control to the third transistor such that the clamp control and the predriver are not both coupled to the third transistor at the same time.

9. The circuit of claim 1, wherein the fourth switch is configured to couple the voltage regulator to a gate of the second transistor, and wherein the fifth switch is configured to couple the clamp control to a gate of the third transistor.

10. The circuit of claim 1, wherein the voltage regulator is configured to maintain a signal supplied to the antenna port at a stable voltage without requiring a coupling of the voltage regulator to any additional transistor.

11. The circuit of claim 1, wherein the clamp control is configured to prevent a voltage at the antenna port from exceeding a predefined magnitude without requiring a coupling of the clamp control to any additional transistor.

12. The circuit of claim 1, further comprising: a sixth switch configured to couple the first switch to the antenna.

13. A near field communications (NFC) device comprising:
    a first antenna port coupled to a first plurality of transistors including a first transistor, a second transistor, and a third transistor;
    a second antenna port coupled to a second plurality of transistors;
    a predriver configured to be coupled to the first plurality of transistors and the second plurality of transistors;
    a first switch configured to couple the predriver to the first transistor;
    a second switch configured to couple the predriver to the second transistor;
    a third switch configured to couple the predriver to the third transistor;
    a voltage regulator configured to be coupled to the first antenna port and the second antenna port;
    a fourth switch configured to couple the voltage regulator to the second transistor;
    a clamp control configured to be coupled to the first antenna port and the second antenna port; and
    a fifth switch configured to couple the clamp control to the third transistor, wherein:
        during a first mode, the first switch, the second switch, and the third switch are configured to close while the fourth switch and the fifth switch are configured to open, and
        during a second mode, the first switch, the second switch, and the third switch are configured to open while the fourth switch and the fifth switch are configured to close.

14. The NFC device of claim 13, wherein the NFC device is configured to receive information instructing the NFC device to place the first antenna port in the first mode or the second mode, wherein the first mode is a reader mode, and wherein the second mode is a target mode.

15. The NFC device of claim 13, wherein the fourth switch is configured to couple the voltage regulator to the second transistor such that the voltage regulator and the predriver are not both coupled to the second transistor at the same time.

16. The NFC device of claim 13, wherein the fifth switch is configured to couple the clamp control to the third transistor such that the clamp control and the predriver are not both coupled to the third transistor at the same time.

17. The NFC device of claim 13, further comprising: a sixth switch configured to couple the first switch to the first antenna port.

18. A method comprising:
    determining whether an antenna port is used to receive a magnetic field or to create the magnetic field; and
    in response to determining that the antenna port is used to create the magnetic field:
        coupling, via a first switch, a predriver to a first transistor,
        coupling, via a second switch, the predriver to a second transistor,
        coupling, via a third switch, the predriver to a third transistor,
        decoupling, via a fourth switch, a voltage regulator from the second transistor, and
        decoupling, via a fifth switch, a clamp control from the third transistor, wherein, if the antenna port is configured to receive the magnetic field, the first switch, the second switch, and the third switch are open while the fourth switch and the fifth switch are closed.

19. The method of claim 18, further comprising:
    in response to determining that the antenna port is used to receive the magnetic field:
        decoupling, via the first switch, the predriver from the first transistor,
        decoupling, via the second switch, the predriver from the second transistor,
        decoupling, via the third switch, the predriver from the third transistor,
        coupling, via the fourth switch, the regulator to the second transistor, and
        coupling, via the fifth switch, the clamp control to the third transistor.

20. The method of claim 18, further comprising determining whether the antenna port is used to receive the magnetic field or to create the magnetic field based on instructions received from a host near field communications (NFC) device.

* * * * *

UNITED STATES PATENT AND TRADEMARK OFFICE
CERTIFICATE OF CORRECTION

| | | |
|---|---|---|
| PATENT NO. | : 9,020,424 B2 | Page 1 of 1 |
| APPLICATION NO. | : 13/523445 | |
| DATED | : April 28, 2015 | |
| INVENTOR(S) | : Alastair Lefley | |

It is certified that error appears in the above-identified patent and that said Letters Patent is hereby corrected as shown below:

Claims

Column 14, line 58, Claim 6, please replace "circuit at first antenna" with --circuit at the antenna--.

Signed and Sealed this
Eighth Day of December, 2015

Michelle K. Lee
*Director of the United States Patent and Trademark Office*